(12) United States Patent
Messing et al.

(10) Patent No.: US 11,788,506 B2
(45) Date of Patent: Oct. 17, 2023

(54) ROTOR BLADE AND WIND TURBINE

(71) Applicant: Wobben Properties GmbH, Aurich (DE)

(72) Inventors: Ralf Messing, Aurich (DE); Jochen Stemberg, Aurich (DE); Hauke Maass, Aurich (DE)

(73) Assignee: Wobben Properties GmbH, Aurich (DE)

(*) Notice: Subject to any disclaimer, the term of this patent is extended or adjusted under 35 U.S.C. 154(b) by 113 days.

(21) Appl. No.: 17/612,124

(22) PCT Filed: May 15, 2020

(86) PCT No.: PCT/EP2020/063679
§ 371 (c)(1),
(2) Date: Nov. 17, 2021

(87) PCT Pub. No.: WO2020/234176
PCT Pub. Date: Nov. 26, 2020

(65) Prior Publication Data
US 2022/0235735 A1 Jul. 28, 2022

(30) Foreign Application Priority Data
May 17, 2019 (DE) ............. 10 2019 113 080.8

(51) Int. Cl.
*F03D 1/06* (2006.01)
(52) U.S. Cl.
CPC ...... *F03D 1/0641* (2013.01); *F05B 2240/304* (2020.08); *F05B 2240/305* (2020.08)

(58) Field of Classification Search
CPC .... F03D 1/0633; F03D 1/0675; F03D 1/0641; F03D 1/0683; F03D 1/0658;
(Continued)

(56) References Cited

U.S. PATENT DOCUMENTS

| 5,265,830 A | 11/1993 | Allen | |
| 7,857,597 B2* | 12/2010 | Anjuri | ............ F03D 1/0641 416/235 |

(Continued)

FOREIGN PATENT DOCUMENTS

| DE | 102011012965 A1 | 9/2012 |
| DE | 202016101461 U1 | 5/2016 |

(Continued)

*Primary Examiner* — J. Todd Newton
*Assistant Examiner* — Wayne A Lambert
(74) *Attorney, Agent, or Firm* — SEED INTELLECTUAL PROPERTY LAW GROUP LLP

(57) ABSTRACT

A rotor blade of a wind turbine, having a rotor blade length, a rotor blade depth extending over the rotor blade length, a rotor blade thickness extending over the rotor blade length, and a thickness of a trailing edge of the rotor blade extending over the rotor blade length, wherein, in a region of the rotor blade length, the rotor blade simultaneously has a splitter plate that has a predetermined length and a Gurney flap that has a predetermined height, wherein a ratio of the predetermined height of the Gurney flap to the predetermined length of the splitter plate at a particular position in the direction of the rotor blade length is selected in such a manner that a threshold value that decreases with a relative profile thickness, which is defined as a ratio of the rotor blade thickness to the rotor blade depth, is not reached.

14 Claims, 3 Drawing Sheets

(58) Field of Classification Search
CPC .......... F05B 2240/305; F05B 2240/304; F05B 2240/30; F05B 2240/221; F05B 2230/50; Y02E 10/72; Y02P 70/50
See application file for complete search history.

(56) References Cited

U.S. PATENT DOCUMENTS

| | | | |
|---|---|---|---|
| 8,668,462 B2 | 3/2014 | Fischer et al. | |
| 9,945,357 B2* | 4/2018 | Enevoldsen | F03D 7/0204 |
| 10,767,625 B2* | 9/2020 | Kamruzzaman | F03D 1/0633 |
| 10,830,203 B2* | 11/2020 | Whitehouse | F03D 1/0641 |
| 2004/0013512 A1* | 1/2004 | Corten | F03D 1/0641 |
| | | | 415/4.1 |
| 2009/0263252 A1* | 10/2009 | Slot | F03D 1/0641 |
| | | | 416/223 R |
| 2010/0047070 A1 | 2/2010 | Slot et al. | |
| 2011/0243753 A1* | 10/2011 | Lenz | F03D 1/0641 |
| | | | 416/241 R |
| 2012/0195764 A1* | 8/2012 | Fuglsang | F03D 1/0641 |
| | | | 416/223 R |
| 2012/0201690 A1* | 8/2012 | Fuglsang | F03D 1/0675 |
| | | | 416/235 |
| 2013/0094970 A1* | 4/2013 | Fukami | F03D 1/0633 |
| | | | 416/223 R |
| 2013/0259689 A1* | 10/2013 | Eisenberg | F03D 1/0633 |
| | | | 416/23 |
| 2015/0176563 A1 | 6/2015 | Grasso | |
| 2016/0305398 A1* | 10/2016 | Carroll | F03D 1/0633 |
| 2019/0024631 A1 | 1/2019 | Tobin et al. | |
| 2019/0032631 A1 | 1/2019 | Hoffmann | |
| 2021/0079886 A1 | 5/2021 | Kneissl et al. | |
| 2023/0094997 A1* | 3/2023 | Gaudern | F03D 1/0633 |
| | | | 416/223 R |

FOREIGN PATENT DOCUMENTS

| | | | | |
|---|---|---|---|---|
| DE | 102018103678 A1 | 8/2019 | | |
| EP | 2366891 A1 | 9/2011 | | |
| EP | 2806156 A1 | 11/2014 | | |
| GB | 2526847 A | * 12/2015 | ........... | F03D 1/0633 |
| WO | 2016/055076 A1 | 4/2016 | | |

* cited by examiner

ROTOR BLADE AND WIND TURBINE

BACKGROUND

Technical Field

The invention relates to a rotor blade of a wind turbine, an associated wind turbine and an associated method.

Description of the Related Art

Attachments to rotor blades of wind turbines, for the purpose of increasing aerodynamic efficiency, are known. Known inter alia are eddy generators, also known as vortex generators, which are often attached in the region near the hub, preferably on the suction side of the rotor blade, and which ensure mixing of the boundary layer flow, as a result of which the flow remains close against the surface of the rotor blade over a longer distance before a flow separation occurs.

The delayed flow separation makes it possible to realize greater angles of attack and correspondingly greater maximum lift coefficients on the profile section.

In addition to the eddy generators, other aerodynamic attachments are also known. For example, aerodynamic flaps, or also so-called spoilers, also known as Gurney flaps in the technical literature, are used.

The Gurney flaps in this case are preferably attached in the region near the hub of the rotor blade, on the pressure side in the region of the trailing edge, i.e., on cylindrical or elliptical profiles in the region located just before the flow separation.

FIG. 2 shows, in schematic form, an example of a profile section 200 through a rotor blade of a wind turbine. A suction side 202 is located opposite a pressure side 204 and connects a leading edge 206 to a trailing edge 208. A profile chord that has a rotor blade depth C extends between the leading edge 206 and a center of the trailing edge 208. In this example, the profile is one that has a thick trailing edge 208, having a thickness T. The thickness T is defined perpendicular to the rotor blade depth C. Inclined thick trailing edges 208 are also conceivable, there being a projection to the perpendicular to the rotor blade depth C, for comparability. Both a Gurney flap 220 and a splitter plate 230 are attached to, or in the region of, the trailing edge 208. The Gurney flap 220 is realized, for example, in the form of a metal plate angle and in this example is perpendicular to the rotor blade depth C. The height H of the Gurney flap 220 denotes the extent of the Gurney flap 220 perpendicular to the rotor blade depth C from the trailing edge 208. A length L of the splitter plate 230 denotes a dimension of the splitter plate 230 parallel to the rotor blade depth C beyond the trailing edge 208.

FIG. 2 therefore shows a schematic rotor blade profile that has a flat or blunt trailing edge 208, also referred to as a flatback profile.

A Gurney flap in principle enables the curvature of a profile to be significantly increased at the trailing edge, which can result in a significant increase in lift. However, this also has the disadvantage of increasing the aerodynamic moment $c_m$ and, most importantly, also the drag coefficient $c_d$. Gurney flaps are therefore useful where a high lift is required but a low drag coefficient is not absolutely necessary. In wind turbines, this is mainly the case in the region of the rotor blade root. Profiles having a flat trailing edge are also used in this region.

The splitter plate 230, shown for example in FIG. 2, is attached approximately perpendicular to the trailing edge 208, i.e., in particular in the chord direction, to reduce drag. This component is called a splitter plate because it divides the wake region of the trailing edge 208 into two parts. The use of the splitter plate 230 prevents the formation of a high-energy periodic vortex street behind profiles that have a flat trailing edge 208.

The process of unsteady vortex shedding in the so-called Kármán vortex street extracts energy from the flow around the profile, and causes a high flow resistance. Often, acting at the profile trailing edge there is a pressure lower than ambient pressure, which causes the resulting force on the trailing edge of the profile to be contrary to the direction of movement of the profile. By deliberately interrupting the vortex interaction at the flat trailing edge 208, the aim is to replace the unsteady vortices with two or more stationary vortices that extract significantly less energy from the flow around the profile. With a suitable design, this measure can significantly reduce the resistance of flatback profiles. A disadvantage of this solution is that slight losses in lift have to be accepted due to the dishing effect of the splitter plate 230.

In summary, the following can be stated with regard to the use of attachments for passive flow control on flatback profiles. The Gurney flaps, which are already frequently used on wind turbines, increase the lift coefficient, but also increase the drag coefficient on the profile section, thereby reducing the lift-to-drag ratio in total. The splitter plates, on the other hand, which hitherto are mainly known from research, reduce the pressure resistance at the flat trailing edge and thus the drag coefficient with, however, reduced lift coefficients, thereby weakening in total the desired increase in the lift-to-drag ratio.

Each attachment, applied in isolation, cannot optimally increase the turbine yield, due to the described properties. Only an increase in lift with a simultaneous reduction in drag would be optimally advantageous with respect to increasing the performance of the rotor blade.

The German Patent and Trade Mark Office has searched the following prior art in the priority application for the present application: DE 10 2011 012 965 A1, DE 10 2018 103 678 A1, DE 20 2016 101 461 U1, US 2010/0 047 070 A1, US 2019/0 024 631 A1, U.S. Pat. No. 5,265,830 A, EP 2 806 156 A1, WO 2016/055 076 A1.

BRIEF SUMMARY

Provided is a rotor blade having improved properties. In particular, provided is a rotor blade combining a Gurney Flap and a splitter plate.

Provided is a rotor blade of a wind turbine, having a rotor blade length, a rotor blade depth extending over the rotor blade length, a rotor blade thickness extending over the rotor blade length, and a thickness of a trailing edge of the rotor blade extending over the rotor blade length. In a region of the rotor blade length, the rotor blade simultaneously has a splitter plate that has a predetermined length and a Gurney flap that has a predetermined height. A ratio of the height of the Gurney flap to the length of the splitter plate at a particular position in the direction of the rotor blade length is selected in such a manner that a threshold value that decreases with a decreasing relative profile thickness, which is defined as a ratio of the rotor blade thickness to the rotor blade depth, is not reached.

The relative profile thickness of a rotor blade profile defines a threshold value that, in turn, influences a ratio of the length of the splitter plate and the height of the Gurney flap. The higher the relative profile thickness, the higher is the threshold value of the ratio of the height of the Gurney flap and the length of the splitter plate. In other words, the higher the relative profile thickness, the higher is the Gurney flap in relation to the length of the splitter plate.

The inventors of the present invention have specifically discovered that, in particular, excessively high Gurney flaps have a negative effect on the performance of the rotor blade, but this effect can be compensated by longer splitter plates, higher relative profile thicknesses, etc. It is thus a particular perception that the threshold value, which is compared with the ratio of the height of the Gurney flap and the length of the splitter plate, is dependent on the relative profile thickness and decreases with the same.

Preferably, the height of the Gurney flap is in any case less than the length of the splitter plate.

Preferably, a quantity ϵ is determined as a ratio of a de-dimensioned height of the Gurney flap and a de-dimensioned length of the splitter plate, wherein the height of the Gurney flap and the length of the splitter plate of the particular position in the direction of the rotor blade length are selected in such a manner that a threshold value that decreases with a decreasing relative profile thickness, which is defined as a ratio of the rotor blade thickness to the rotor blade depth, is not reached.

The quantity ϵ affords a substantially profile-independent evaluation, since both the height of the Gurney flap and the length of the splitter plate are de-dimensionalized, and thus non-dependent on the specific design of the rotor blade. The quantity ϵ therefore affords comparability and a generally valid evaluation in order to determine the length of the splitter plate, or the height of the Gurney flap.

At the particular position in the direction of the rotor blade length means that a particular profile section of the rotor blade is used for evaluation. Both the splitter plate and the Gurney flap have a certain extent in the longitudinal direction. The evaluation of the ratio is effected at a particular position, i.e., with respect to a particular profile section.

It is particularly preferred that the ratio be maintained over a predetermined length in the direction of the rotor blade length. In particular, the ratio evaluated is achieved over the entire region in which the splitter plate and the Gurney flap extend together in the longitudinal direction of the rotor blade.

Preferably, the de-dimensioned height of the Gurney flap is a ratio of the height of the Gurney flap and the rotor blade depth, and/or the de-dimensioned length of the splitter plate is a ratio of the length of the splitter plate and the thickness of the trailing edge.

Preferably, the Gurney flap and the splitter plate are dimensioned in such a manner that the quantity ϵ over the region of the Gurney flap and the splitter plate in the longitudinal direction of the rotor blade is in a range of between 0 and a function of the relative thickness $\epsilon_{limit}=f(\text{relTh}(r))$:

$$0 \leq \epsilon(\text{relTh}(r)) \leq \epsilon_{limit}(\text{relTh}(r)).$$

Preferably, the function of the relative thickness $\epsilon_{limit}$ is defined as follows:

$$\epsilon_{limit} = f(\text{relTh}(r)) = \begin{cases} 0, & \text{relTh} < 0.16 \\ 0.881 \cdot \text{relTh}(r) - 0.081, & 0.16 \leq \text{relTh}(r) \leq 1.00 \\ 0, & \text{relTh} > 1.00 \end{cases}.$$

Preferably, the length of the splitter plate is in a range of from 25% to 150% of the thickness of the trailing edge at the particular position in the longitudinal direction of the rotor blade.

Preferably, the height of the Gurney flap is at most 30%, in particular at most 10%, and especially preferably at most 3% of the rotor blade depth at the particular position in the longitudinal direction of the rotor blade. The more closely the profile at the particular position in the longitudinal direction of the rotor blade approaches a circular cylinder, i.e., the greater the relative thickness becomes, the greater preferably is the maximally fitted Gurney flap, relative to the rotor blade depth.

Preferably, therefore, the maximum height of the Gurney flap is a function of the relative thickness. The lower the relative thickness, the lower preferably is also the height of the Gurney flap, particularly preferably relative to the rotor blade depth.

Preferably, the rotor blade thickness in the region of the Gurney flap and the splitter plate is at least 16% of the rotor blade depth.

Provided is a wind turbine having at least one rotor blade according to an embodiment of the invention.

Provided is a wind farm having a plurality of wind turbines according to an embodiment of the invention.

Both the wind turbine and the wind farm may be combined with any preferred designs of the rotor blade to achieve the same advantages.

Provided is a method for designing a rotor blade of a wind turbine, having a rotor blade length, a rotor blade depth extending over the rotor blade length, a rotor blade thickness extending over the rotor blade length, and a thickness of a trailing edge of the rotor blade extending over the rotor blade length. In a region of the rotor blade length, the rotor blade simultaneously has a splitter plate that has a predetermined length and a Gurney flap that has a predetermined height. A ratio of the height of the Gurney flap to the length of the splitter plate at a particular position in the direction of the rotor blade length is determined in such a manner that a threshold value that decreases with a relative profile thickness, which is defined as a ratio of rotor blade thickness to the rotor blade depth, is not reached.

The method may be combined with the preferred designs of the rotor blade, the same advantages being achieved analogously.

BRIEF DESCRIPTION OF THE SEVERAL VIEWS OF THE DRAWINGS

Further advantages and preferred embodiments are described below with reference to the accompanying drawings. There are shown.

DETAILED DESCRIPTION

Figure 1:
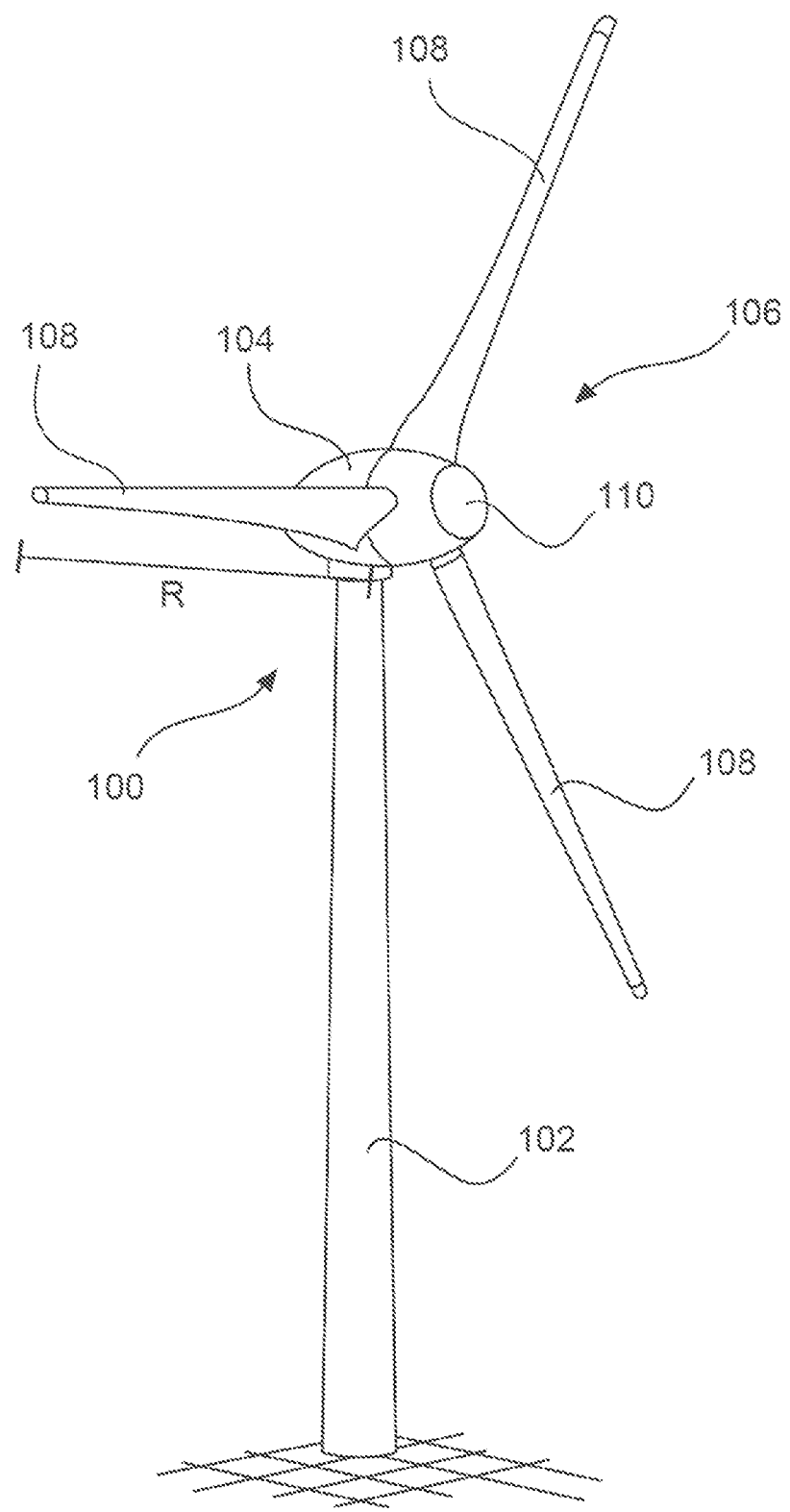
FIG. 1 shows an example of a wind turbine, in schematic form.

FIG. 1 shows a schematic representation of a wind turbine according to the invention. The wind turbine 100 comprises a tower 102, and a nacelle 104 on the tower 102. Provided on the nacelle 104 there is an aerodynamic rotor 106 that has three rotor blades 108, each having a rotor blade length R, and a spinner 110. When the wind turbine is in operation, the aerodynamic rotor 106 is caused to rotate by the wind, and thus also rotates an electrodynamic rotor of a generator that is directly or indirectly coupled to the aerodynamic rotor 106. The electrical generator is arranged in the nacelle 104 and generates electrical energy. The pitch angles of the rotor blades 108 can be varied by pitch motors at the rotor blade roots of the respective rotor blades 108.

Figure 2:
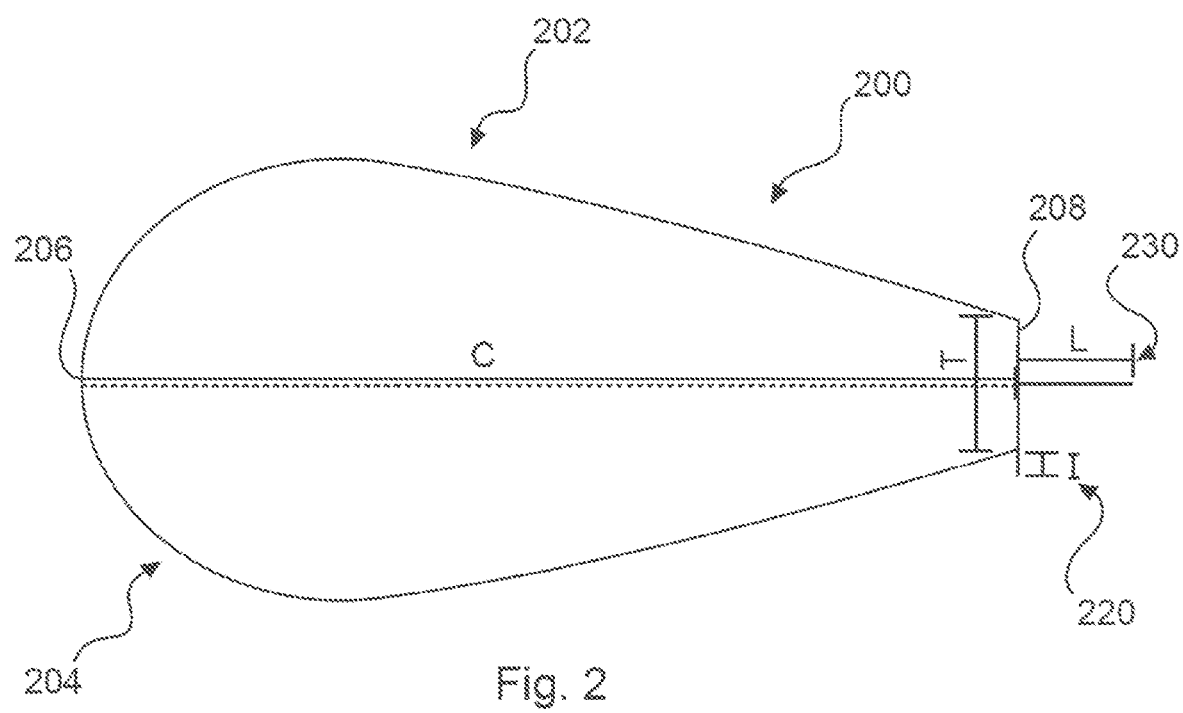
FIG. 2 shows an example of a profile section of a rotor blade, in schematic form.

FIG. 2 shows, as already described, a profile section 200 of the rotor blade 108. Due to the flat, or blunt, trailing edge 208, the profile shown by way of example is regularly located in the region of the rotor blade root, i.e., in a region of the rotor blade 108 close to the hub.

The profile section 200 shows in particular the combination of two aerodynamic attachments, namely the Gurney flap 220 and the splitter plate 230. The two attachments are now ingeniously combined and dimensioned in such a manner that an improved rotor blade is obtained as a result.

Figure 3:
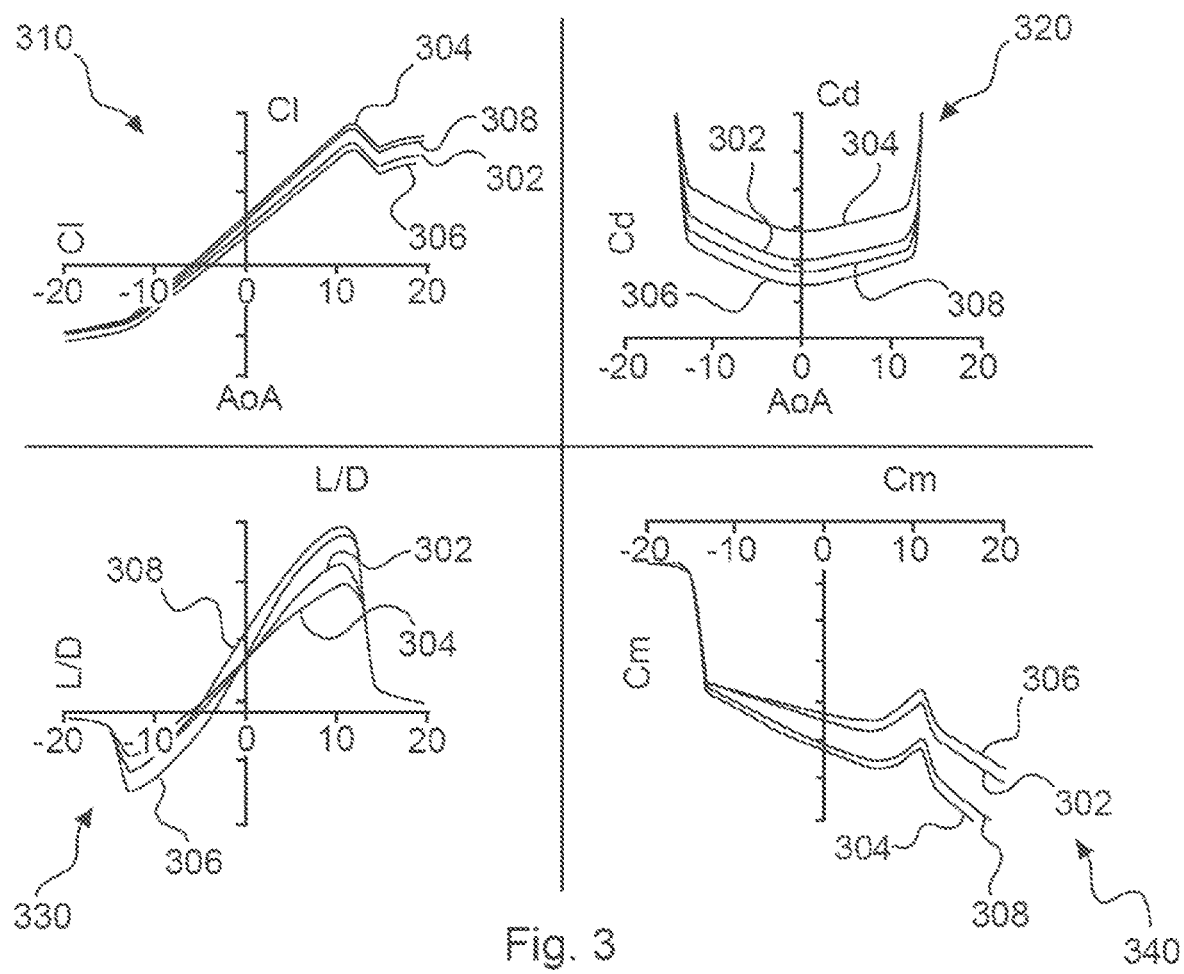
FIG. 3 shows various diagrams of aerodynamic index quantities, as examples, in schematic form.

FIG. 3 shows, in schematic form, examples of characteristics of important index quantities of a rotor blade for a bare rotor blade, for one having only a Gurney flap 220, only a splitter plate 230, and a combination of a splitter plate 230 and a Gurney flap 220, which achieves the optimization described herein. A bare rotor blade means, in particular, a rotor blade without aerodynamic attachments.

In a first diagram 310, the profile of a lift coefficient Cl is plotted on the vertical against the profile angle of attack AoA on the horizontal. In a diagram 320, a drag coefficient Cd is also plotted against the profile angle of attack AoA. A diagram 330 plots the lift-to-drag ratio L/D against the profile angle of attack AoA, and a diagram 340 plots the moment coefficient Cm against the profile angle of attack AoA.

In each of the diagrams 310, 320, 330, 340 the characteristic of the bare rotor blade is shown as a graph 302, the characteristic with only the Gurney flap 220 is shown as a graph 304, the characteristic of the rotor blade with only the splitter plate 230 is shown as a graph 306, and the characteristic the rotor blade with the combination of splitter plate 230 and Gurney flap 220 optimized is represented as a graph 308.

It can be seen that the combination of Gurney flap 220 and splitter plate 230 produces a greatest possible increase in performance. In this case, the drag reducing effect of the splitter plate 230 and, at the same time, the lift increasing effect of the Gurney flap 220 are obtained, because the attachments, especially their relation to the rotor blade profile, are optimized. Thus, the lift-to-drag ratio L/D, in particular of flatback airfoils, can be significantly increased, which in turn has a positive effect on the efficiency of the wind turbine.

Preferably, the quantity ε is therefore defined for dimensioning the combined application of Gurney flap 220 and splitter plate 230.

$$\varepsilon = \frac{HT}{LC}$$

Therein:
H: height of the Gurney flap 220
L: length of the splitter plate 230
T: thickness of the trailing edge 208 of the flatback profile
C: blade depth, i.e., length of the chord of the rotor blade 108.

Figure 4:
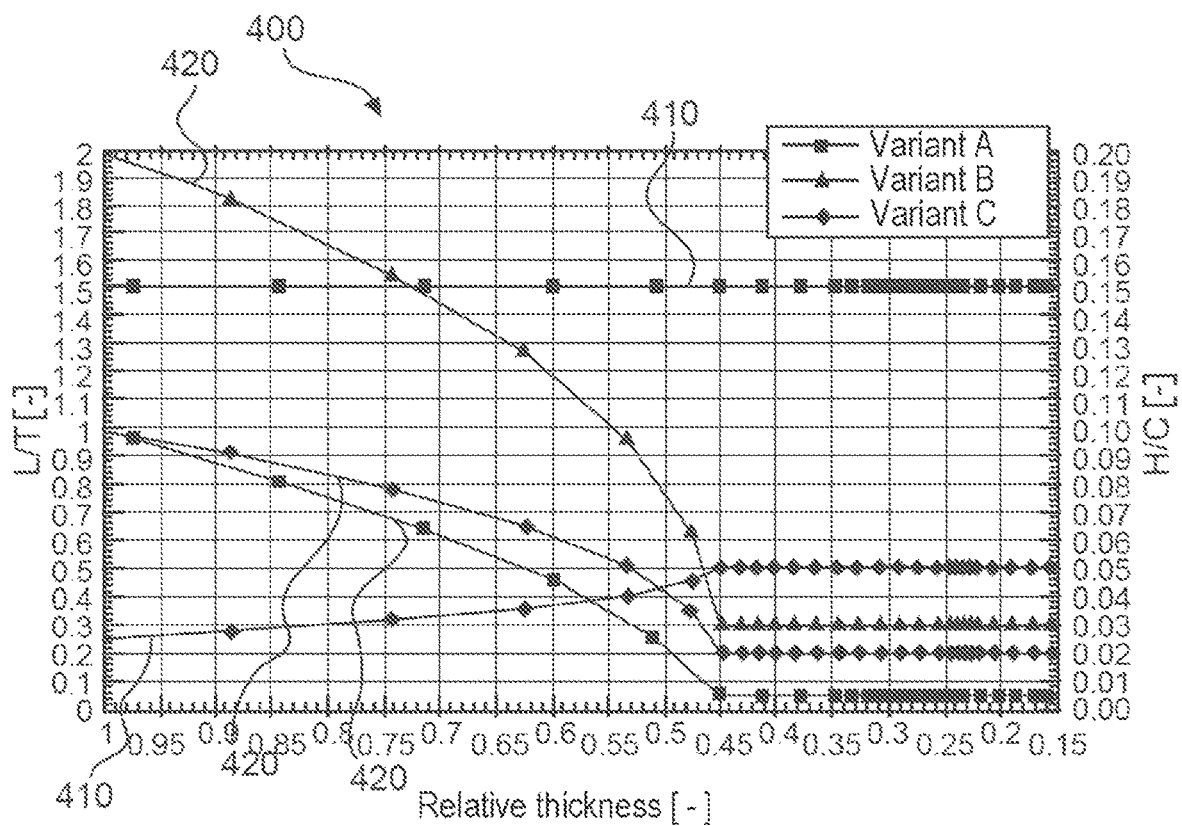
FIG. 4 shows an example of a characteristic of particular variables over a relative thickness of the rotor blade, in schematic form.

Shown in schematic form in FIG. 4, as an example, is a diagram 400, in which characteristics 410 of a de-dimensioned splitter plate length L/T and characteristics 420 of a de-dimensioned Gurney flap height H/C are represented as a function of a relative thickness, on the horizontal axis, for different variants of suitable combinations of a Gurney flap 220 and splitter plate 230.

The scale of the de-dimensioned splitter plate length L/T shown on the left in the diagram 400 thus relates to the characteristics 410, while the scale of the de-dimensioned Gurney flap height H/C shown on the right side relates to the characteristics 420. Related variants are represented in the characteristics 410, 420 by the same symbols, i.e., by rectangles or lozenges. It can be seen that in an optimized region the relative Gurney flap heights H/C decrease with decreasing relative thickness and remain constant from a certain range onwards, in the example above from a relative thickness of 0.45 at most. In contrast, it has been found that the optimized de-dimensioned splitter plate length L/T remains constant, or even increases, with decreasing relative thickness.

Figure 5:
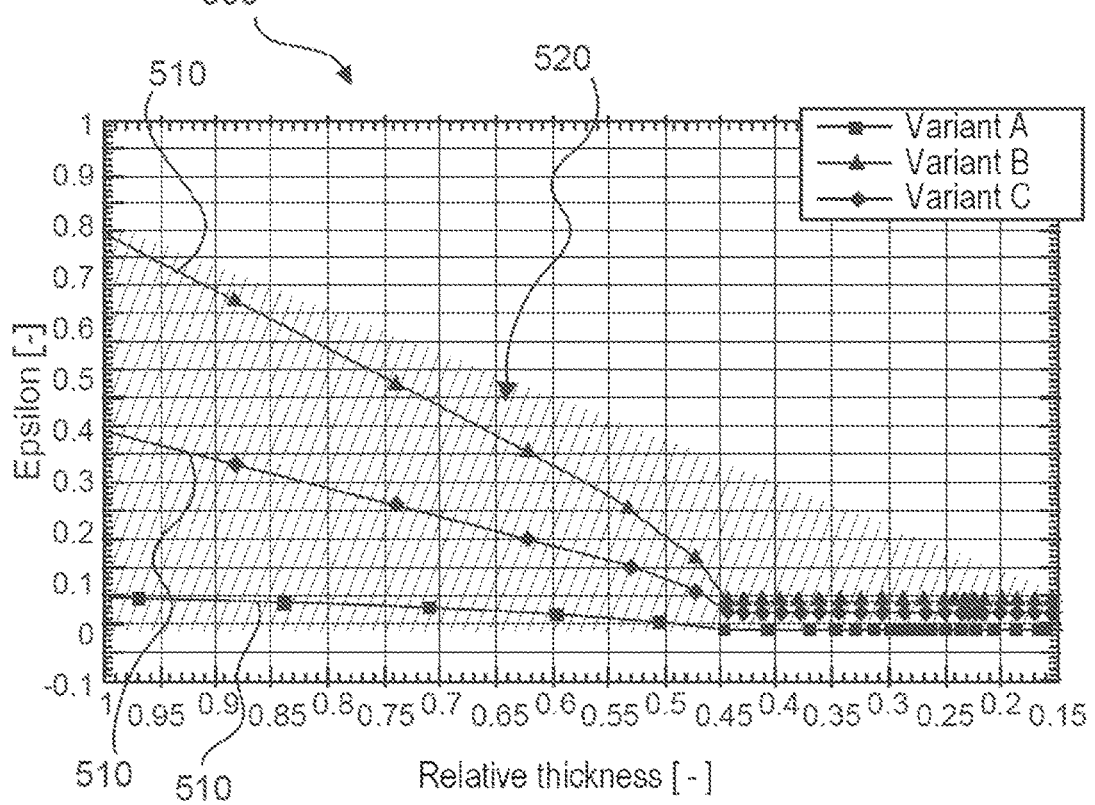
FIG. 5 shows an example of a characteristic of a quantity over the relative thickness of the rotor blade, in schematic form.

If the characteristics 410 and 420 are correlated to each other and the above-mentioned quantity ε is used for this purpose, the range to be protected can be found, which can be seen in schematic form, as an example, in the diagram 500 shown in FIG. 5.

In FIG. 5 characteristics 510 for the dimensionless quantity ε are plotted on the vertical for different relative thicknesses on the horizontal. It can be seen that the characteristics of all preferred variants of combinations of relative thickness, length L of the splitter plate 230 and height H of the Gurney flap 220 lie within an advantageous quantity range 520. The quantity range 520 is determined by an upper bound that decreases with decreasing relative thickness, in particular decreases linearly, and by a lower bound, which in this example is 0.

$$\varepsilon_{limit} = f(relTh(r)) = \begin{cases} 0, relTh < 0.16 \\ 0.881 \cdot relTh(r) - 0.081, 0.16 \leq relTh(r) \leq 1.00 \\ 0, relTh > 1.00 \end{cases}$$

The relative thickness, "relTh", is a function of a usually relative position r in the longitudinal direction of the rotor blade R, where here a position of 0 corresponds to the rotor blade root or, in an alternative definition, to the axis of rotation, and a position of 1 corresponds to the rotor blade tip.

Against this background, the quantity range 520 may be described by the formula $$0 \leq \varepsilon(relTh(r)) \leq \varepsilon_{limit}(relTh(r))$$

As long as the quantity ε lies in this range, with the upper bound decreasing as the relative profile thickness decreases, i.e., usually with increasing relative radius r, the result is a particularly attractive rotor blade that combines the advantages of the splitter plate 230 and the Gurney flap 220. Thus, when both components are used simultaneously in the longitudinal direction of the rotor blade, the in each case both drag-reducing effect of the splitter plate 230 and the lift-increasing effect of the Gurney flap 220 are obtained.

A field of application is, in particular, rotor blades 108 for and on wind turbines 100 having rotor blade profiles 200 that have a flat trailing edge 208, so-called flatback profiles.

Furthermore, the invention is also applicable to rotor blades 108 having profiles that have a pointed trailing edge, to the trailing edge of which a Gurney flap has been attached for the purpose of increasing lift.

The invention claimed is:

1. A rotor blade of a wind turbine, comprising:
    a rotor blade length, a rotor blade depth extending over the rotor blade length, a rotor blade thickness extending over the rotor blade length, and a thickness of a trailing edge of the rotor blade extending over the rotor blade length,
    wherein, in a region of the rotor blade length, the rotor blade has a splitter plate having a predetermined length and a Gurney flap having a predetermined height,
    wherein a ratio of the predetermined height of the Gurney flap to the predetermined length of the splitter plate at a particular position in the direction of the rotor blade length is selected in such a manner that a threshold value that decreases with a decreasing relative profile thickness, which is defined as a ratio of the rotor blade thickness to the rotor blade depth, is not reached.

2. The rotor blade as claimed in claim 1, wherein the predetermined height of the Gurney flap is less than the predetermined length of the splitter plate.

3. The rotor blade as claimed in claim 1, wherein a quantity $\epsilon$ is determined as a ratio of a de-dimensioned height of the Gurney flap and a de-dimensioned length of the splitter plate, wherein the predetermined height of the Gurney flap and the predetermined length of the splitter plate of the particular position in the direction of the rotor blade length are selected in such a manner that a threshold value that decreases with a decreasing relative profile thickness is not reached, wherein the decreasing relative profile thickness is defined as a ratio of the rotor blade thickness to the rotor blade depth.

4. The rotor blade as claimed in claim 3, wherein the de-dimensioned height of the Gurney flap is a ratio of the predetermined height of the Gurney flap and the rotor blade depth, or the de-dimensioned length of the splitter plate is a ratio of the predetermined length of the splitter plate and the thickness of the trailing edge.

5. The rotor blade as claimed in claim 3, wherein the Gurney flap and the splitter plate are dimensioned in such a manner that the quantity $\epsilon$ over a region of the Gurney flap and the splitter plate at the particular position in the direction of the rotor blade length is in a range of between 0 and a function of the relative thickness $\epsilon_{limit}=f(\text{relTh}(r))$:

$$0 \le \epsilon(\text{relTh}(r)) \le \epsilon_{limit}(\text{relTh}(r))$$

wherein relTh is the relative thickness, and
wherein r is relative radius.

6. The rotor blade as claimed in claim 5, wherein the function of the relative thickness $\epsilon_{limit}$ is defined as follows:

$$\epsilon_{limit} = f(\text{relTh}(r)) = \begin{cases} 0, & \text{relTh} < 0.16 \\ 0.881 \cdot \text{relTh}(r) - 0.081, & 0.16 \le \text{relTh}(r) \le 1.00 \\ 0, & \text{relTh} > 1.00 \end{cases}$$

7. The rotor blade as claimed in claim 1, wherein the predetermined length of the splitter plate is in a range of from 25% to 150% of the thickness of the trailing edge at the particular position in the direction of the rotor blade length.

8. The rotor blade as claimed in claim 1, wherein the predetermined height of the Gurney flap is at most 30% of the rotor blade depth at the particular position in the direction of the rotor blade length.

9. The rotor blade as claimed in claim 1, wherein the rotor blade thickness in the region having the Gurney flap and the splitter plate is at least 16% of the rotor blade depth.

10. A wind turbine comprising a rotor and at least one rotor blade as claimed in claim 1.

11. A wind farm comprising a plurality of wind turbines as claimed in claim 10.

12. A method for making a rotor blade of a wind turbine, the rotor blade having a rotor blade length, a rotor blade depth extending over the rotor blade length, a rotor blade thickness extending over the rotor blade length, and a thickness of a trailing edge of the rotor blade extending over the rotor blade length,
    providing, in a region of the rotor blade length, a splitter plate having a predetermined length and a Gurney flap having a predetermined height,
    wherein the providing comprises determining a ratio of the predetermined height of the Gurney flap to the predetermined length of the splitter plate at a particular position in the direction of the rotor blade length, wherein the ratio is determined in such a manner that a threshold value that decreases with a relative profile thickness is not reached, wherein the relative profile thickness is defined as a ratio of rotor blade thickness to the rotor blade depth.

13. The rotor blade as claimed in claim 8, wherein the predetermined height of the Gurney flap is at most 10% of the rotor blade depth at the particular position in the direction of the rotor blade length.

14. The rotor blade as claimed in claim 8, wherein the predetermined height of the Gurney flap is at most 3% of the rotor blade depth at the particular position in the direction of the rotor blade length.

* * * * *